United States Patent
Wang et al.

(10) Patent No.: US 7,755,892 B2
(45) Date of Patent: Jul. 13, 2010

(54) SLIDE MECHANISM AND SLIDE-TYPE TERMINAL DEVICE USING THE SAME

(75) Inventors: Jin-Xin Wang, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/343,804

(22) Filed: Dec. 24, 2008

(65) Prior Publication Data

US 2010/0033910 A1    Feb. 11, 2010

(30) Foreign Application Priority Data

Aug. 8, 2008    (CN)    .......................... 200810303588

(51) Int. Cl.
*G06F 1/16* (2006.01)
(52) U.S. Cl. .............................. 361/679.55; 361/679.56; 455/575.4
(58) Field of Classification Search ............ 361/679.55, 361/679.56; 455/575.4
See application file for complete search history.

(56) References Cited

U.S. PATENT DOCUMENTS

| 2009/0035056 | A1* | 2/2009 | Kim et al. .................... 403/326 |
| 2009/0036180 | A1* | 2/2009 | Ye .......................... 455/575.4 |
| 2009/0069058 | A1* | 3/2009 | Taschke ................... 455/575.4 |
| 2009/0147453 | A1* | 6/2009 | Hsieh et al. ............. 361/679.02 |
| 2009/0156274 | A1* | 6/2009 | Wang ....................... 455/575.4 |
| 2009/0231785 | A1* | 9/2009 | Li et al. ................. 361/679.01 |
| 2009/0247248 | A1* | 10/2009 | Ito .......................... 455/575.4 |
| 2009/0262486 | A1* | 10/2009 | Shi et al. ............... 361/679.01 |
| 2009/0264167 | A1* | 10/2009 | Shi et al. ................ 455/575.4 |
| 2009/0298563 | A1* | 12/2009 | Jung et al. .............. 455/575.4 |

* cited by examiner

*Primary Examiner*—Jayprakash N Gandhi
*Assistant Examiner*—Anthony Q Edwards
(74) *Attorney, Agent, or Firm*—Clifford O. Chi

(57) ABSTRACT

A slide mechanism includes a rear cover, a front cover, and two elastic members. The front cover is slidably attached to the rear cover. The elastic members are connected between the rear cover and the front cover. Each elastic member includes two spring coils and an arched elastic arm connecting the spring coils. The arched elastic arm provides an elastic force to make the front cover slide relative to the rear cover. A slide-type terminal device using the slide mechanism is also provided.

16 Claims, 6 Drawing Sheets

SLIDE MECHANISM AND SLIDE-TYPE TERMINAL DEVICE USING THE SAME

BACKGROUND

1. Technical Field

The present disclosure relates to slide mechanisms and, particularly, to a slide mechanism for a slide-type terminal device.

2. Description of the Related Art

Slide mechanisms are widely used in slide-type terminal devices, such as slide-type mobile phones and slide-type personal digital assistants. A typical slide-type terminal device generally includes two housings. One housing slides over the other housing, thereby opening or closing the terminal device.

A typical slide mechanism includes a first sheet, a second sheet slidably connected to the first sheet, and a torsion spring positioned between the first and second sheets. The first and the second sheets are respectively fixed on a display unit and a main unit of the typical slide-type terminal device. The torsion spring includes a spring coil made by bending thin metallic wires and provides a torsion force between the first and second sheets, thus making it easier to open or close the terminal device.

However, in use, the torsion force is concentrated at the spring coil of the torsion spring, so that the spring coil is easily damaged or unduly deformed. After repeated use, the torsion force created by the torsion spring decreases, and may be incapable of providing additional force to open or close the terminal device. Therefore, a usage life of the slide mechanism is relatively short.

Therefore, a new slide mechanism and a slide-type terminal device are desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
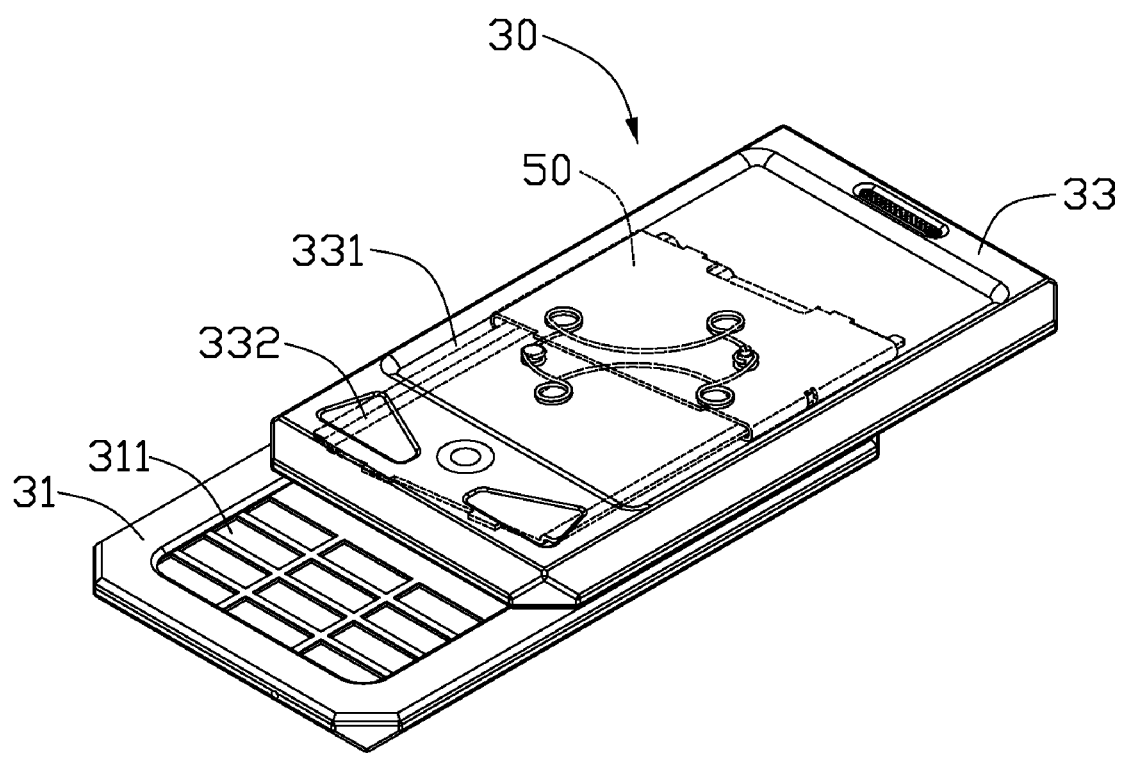
FIG. 1 is an assembled, isometric view of an embodiment of a slide-type terminal device including a slide mechanism.
Figure 2:
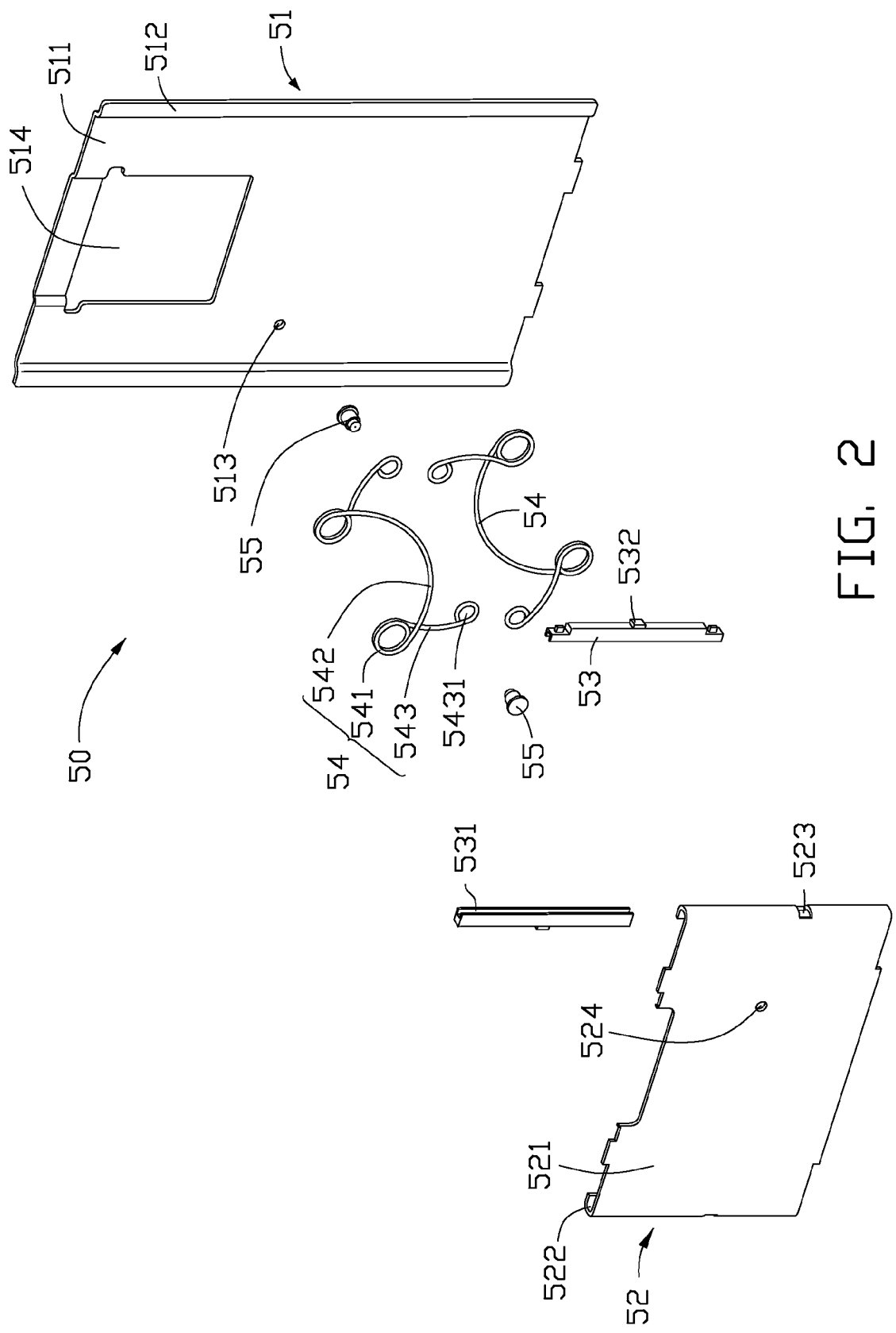
FIG. 2 is an exploded, isometric view of an embodiment of the slide mechanism.

Referring to FIGS. 1 and 2, an embodiment of a slide mechanism 50 is shown for use in a slide-type terminal device such as a slide-type mobile phone 30. The mobile phone 30 includes a first housing 31, a second housing 33, and the slide mechanism 50 for connecting the first and second housings 31, 33. The slide mechanism 50 creates an elastic force sufficient to slide the second housing 33 relative to the first housing between a closed position and an opened position. A top surface of the first housing 31 may be configured with a keypad 311. A top surface of the second housing 33 may be configured with a display 331 and a plurality of function keys 332. The second housing 33 is slidable over the first housing 31 along a length of the first housing 31, thus exposing or covering the keypad 311.

The slide mechanism 50 includes a rear cover 51, a front cover 52, two guiding rails 53, a pair of elastic members 54, and two rivets 55. The rear cover 51 may be fixed on the first housing 31 and the front cover 52 may be fixed on the second housing 33 such that the second housing 33 can be slidably connected to the first housing 31.

The rear cover 51 may be substantially rectangular shaped. The rear cover 51 includes a main plate 511, two side strips 512 extending along opposite sides of the main plate 511. The side strips 512 may be formed by bending opposite side portions of the main plate 511 towards a same side of the rear cover 51. The main plate 511 defines a substantially circular pinhole 513 in a middle portion of the main plate 511 adjacent to one side strip 512 and a substantially rectangular receiving hole 514 adjacent to an end.

The front cover 52 may be a substantially rectangular shaped flat sheet and includes a base 521 and two sliding grooves 522 defined in opposite side portions of the base 521. The sliding grooves 522 engage with the corresponding guiding rails 53. Each sliding groove 522 may be formed by bending a side portion of the base 521 inwards. The front cover 52 further defines a fixing hole 523 in a middle portion of each side portion and the fixing hole 523 communicates with the corresponding sliding groove 522. The base 521 defines a substantially circular pinhole 524 in a middle portion of the base 521 adjacent to one side portion.

Each guiding rail 53 may be a substantially elongated bar. Each guiding rail 53 further defines a guiding groove 531. A protrusion 532 is formed in a middle portion of each guiding rail 53. The protrusion 532 and the guiding groove 531 are at opposite sides of each guiding rail 53. The guiding grooves 531 engage with the corresponding side strips 512 of the rear cover 51, so that the guiding rails 53 can slidably engage with the rear cover 51.

Each elastic member 54 includes two spring coils 541, an arched elastic arm 542 connecting the spring coils 541, and a connecting arm 543 extending from each of the two spring coils 541. An end of each connecting arm 543 is curled, thus defining a fixing hole 5431.

Figure 3:
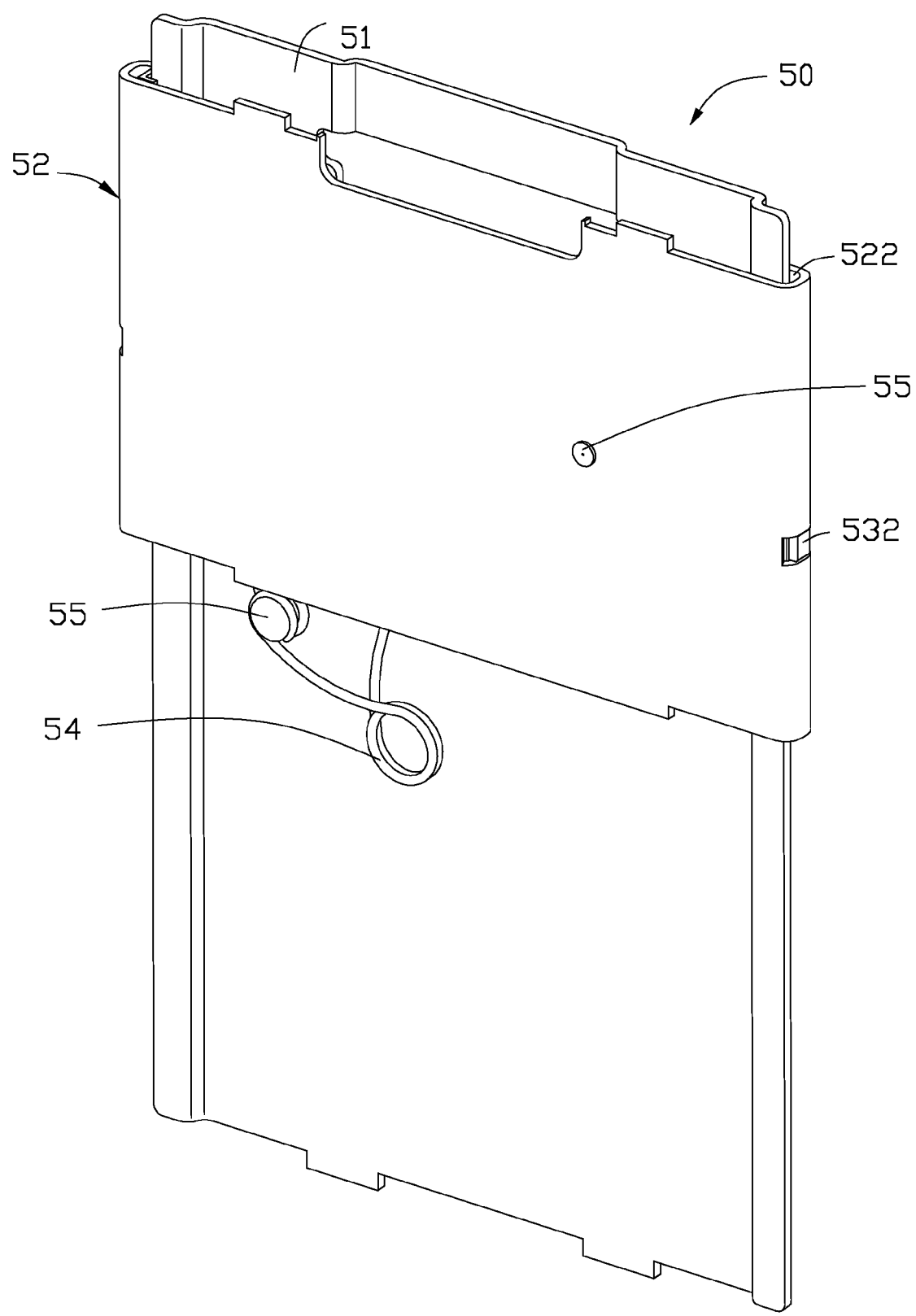
FIG. 3 is an assembled, isometric view of the slide mechanism of FIG. 2.

Referring also to FIG. 3, a first rivet of the two rivets 55 is inserted through a first fixing hole of the fixing holes 5431 of each elastic member 54 and the pinhole 513 of the rear cover 51. An end of the first rivet is riveted to the rear cover 51. Thus, a first end of each elastic member 54 is fixed to the rear cover 51. The guiding rails 53 are securely received in the corresponding sliding grooves 522 of the front cover 52, with the protrusions 532 engaging in the fixing holes 523. The first and second side strips 512 are received in corresponding guiding grooves 531 of the guiding rails 53, thereby slidably mounting the front cover 52 and the guiding rails 53 to the rear cover 51. A second rivet of the two rivets 55 is inserted through a second fixing hole of the fixing holes 5431 of each elastic member 54 and the pinhole 524 of the front cover 52. An end of the second rivet is riveted to the front cover 52. Thus, a second end of each elastic member 54 is fixed to the front cover 52. After the slide mechanism 50 is assembled, the elastic members 54 are symmetrical relative to a line connecting the two rivets 55, and the spring coils 541 abut the rear cover 51.

Referring to FIGS. 1 through 6, in assembling the slide mechanism 50 to the slide-type mobile phone 30, the rear cover 51 is fixed to the first housing 31, and the front cover 52 is fixed to the second housing 33. When the front cover 52 slides over the rear cover 51, the second housing 33 will slide over the first housing 31, thus exposing or covering the keypad 311 of the first housing 31.

Figure 4:
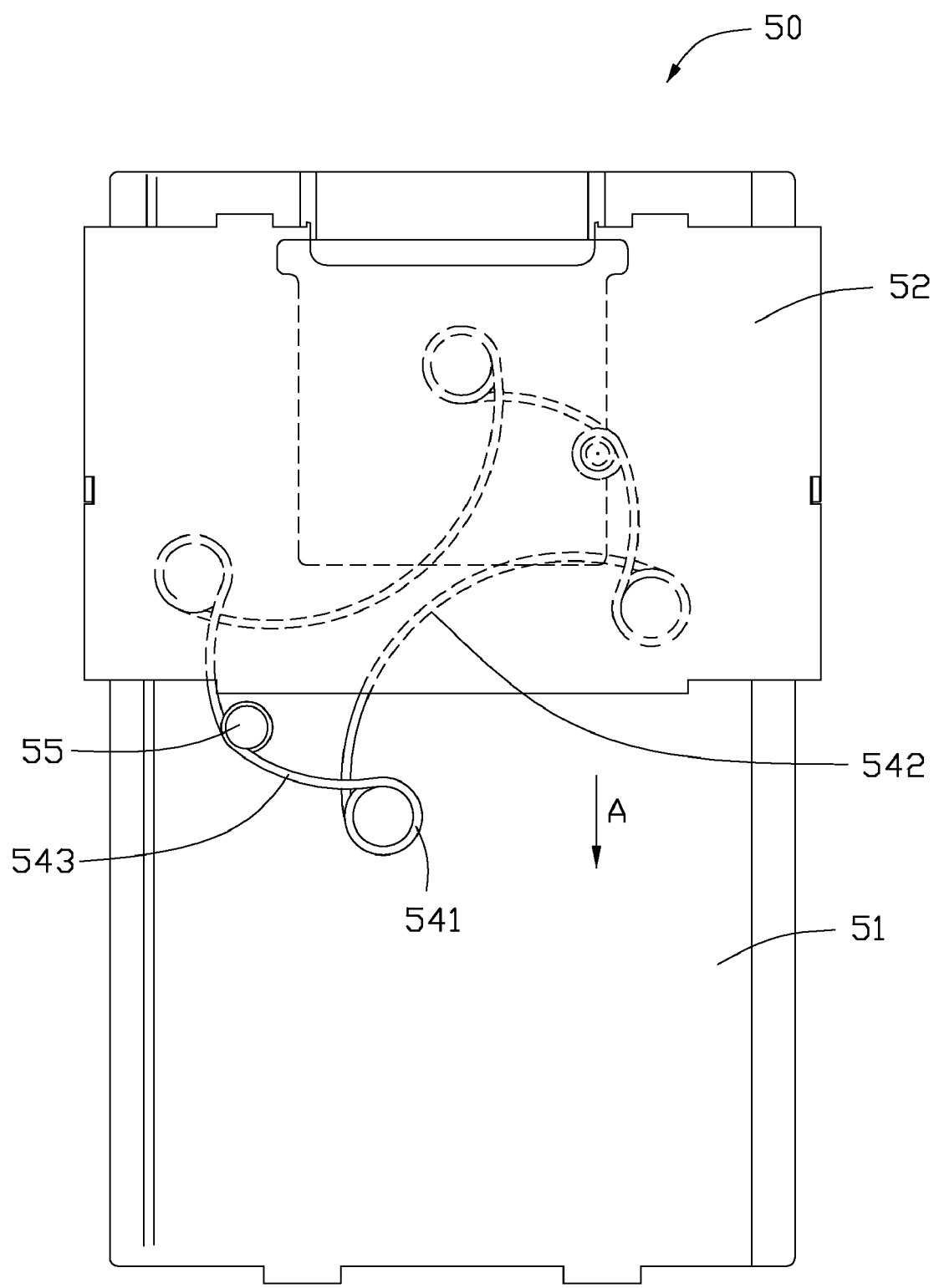
FIG. 4 is an assembled, top view of the slide mechanism of FIG. 2, showing a closed state of the slide mechanism.
Figure 5:
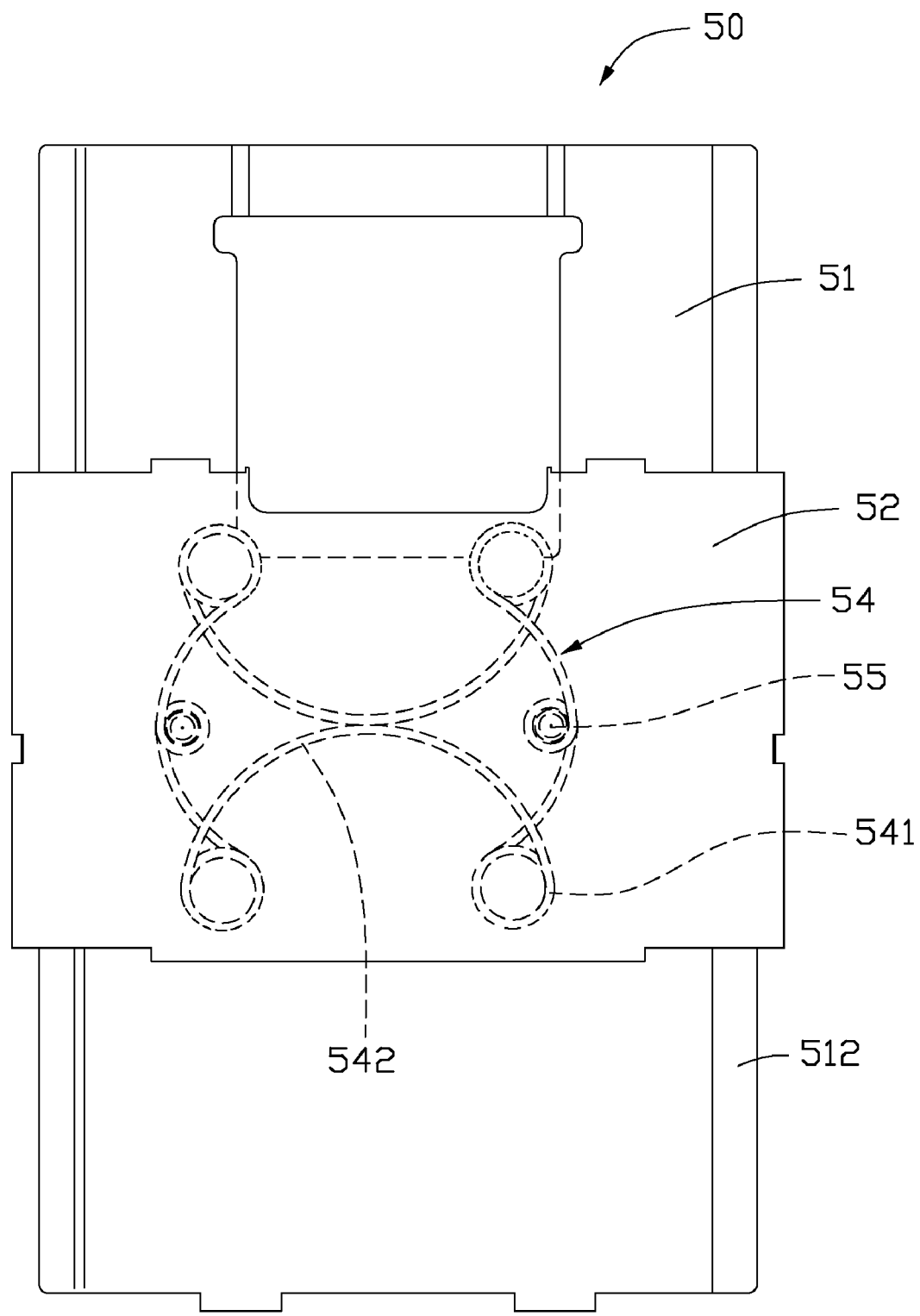
FIG. 5 is similar to FIG. 4, but showing a middle state of the slide mechanism.
Figure 6:
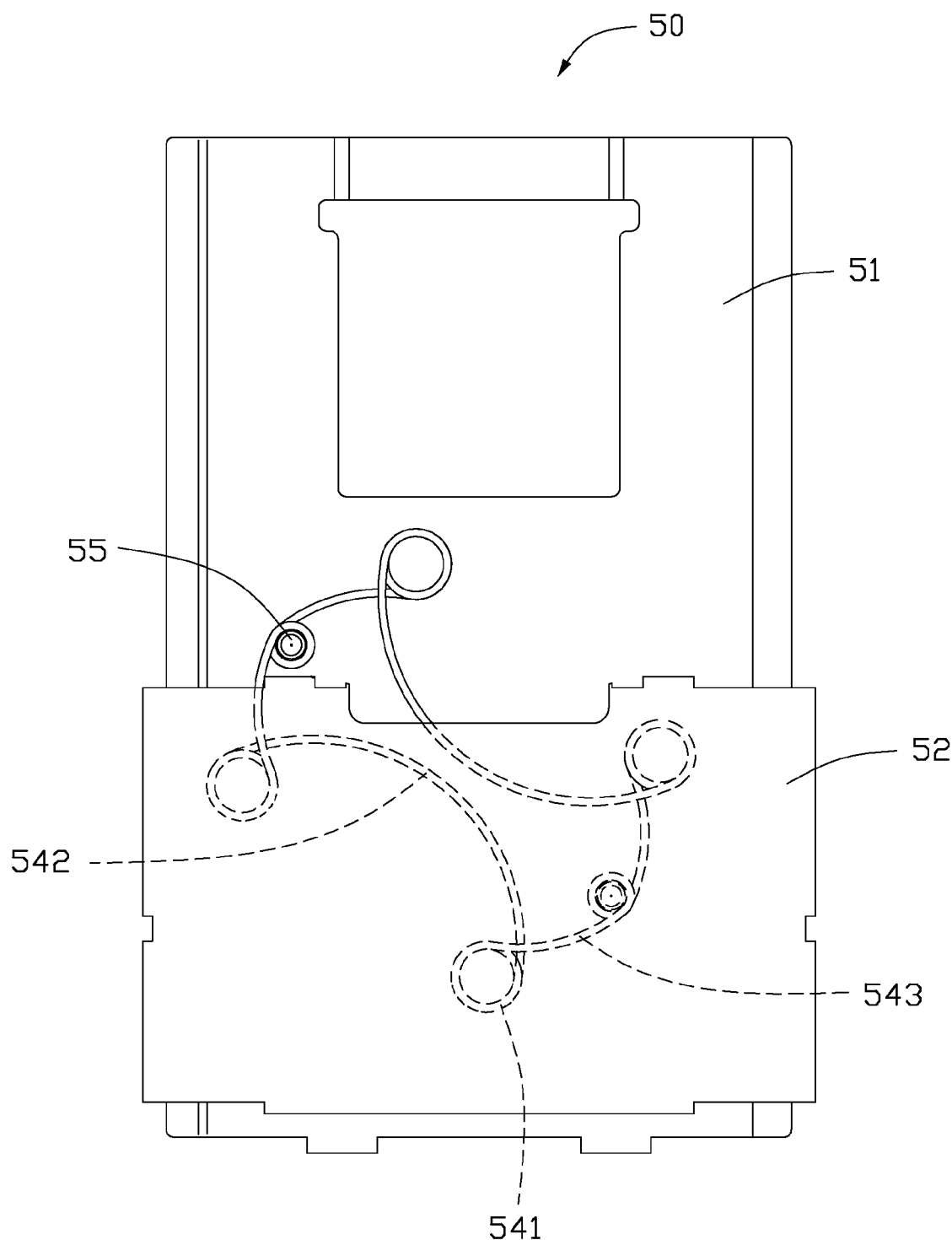
FIG. 6 is similar to FIG. 4, but showing a fully opened state of the slide mechanism.

When the second housing 33 is pushed in a direction from the closed position to the opened position as shown in FIG. 1, to expose the keypad 311 of the first housing 31, the front cover 52 is driven to slide relative to the rear cover 51, along a direction A shown in FIG. 4. The elastic arm 542 of each elastic member 54 is further bent thereby storing potential elastic energy. The spring coils 541 of each elastic member 54 move towards each other and the angular displacement of the elastic arm 542 gradually increases. When the front cover 52 reaches a middle position shown in FIG. 5, the line connecting the two rivets 55 is substantially perpendicular to the side strips 512, and the elastic arms 542 have their largest angular displacement, thereby storing a maximum resilient energy. Immediately after the front cover 52 passes the middle position, the front cover 52 automatically slides under an elastic force created by the elastic arms 542. That is, the second housing 33 is driven by the front cover 52 to automatically slide to the opened position of the FIG. 1. Thus, the spring coils 541 of each elastic member 54 move away from each other and the angular displacement of each elastic arm 542 gradually decreases until the front cover 52 reaches a fully opened position shown in FIG. 6. Similarly, when the second housing 33 is driven to move in a direction from the opened position as shown in FIG. 1 to the closed position, the second housing 33 is driven by the front cover 52 to slide to the closed position.

When the front cover 52 slides relative to the rear cover 51, the elastic arm 542 of each elastic member 54 deforms, thus the elastic force is uniformly distributed on the elastic arms 542, and not concentrated on the spring coils 541. Therefore, a usage life of the elastic members 54 is longer, thereby prolonging a usage life of the slide mechanism. In addition, when the elastic members 54 are positioned between the rear cover 51 and the front cover 52, the spring coils 541 abut the rear cover 51, thus the slide mechanism 50 has a small thickness and can be adapted to a thin slide-type terminal device.

It should be appreciated that the slide mechanism 50 may include only one elastic member 54. In addition, each elastic arm 542 may include a plurality of arched portions. Furthermore, each elastic member 54 may include more than two spring coils 541 and a plurality of elastic arms 542 connecting the spring coils 541. Moreover, the guiding rails 53 may be omitted, and the side strips 512 of the rear cover 51 are directly received in the sliding grooves 522 of the front cover 52.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A slide mechanism, comprising:
   a rear cover comprising a first main plate, and two side strips extending along opposite sides of the first main plate;
   a front cover comprising a second main plate and two grooves extending along opposite sides of the second main plate, slidably attached to the rear cover;
   at least one elastic member connected between the rear cover and the front cover, the at least one elastic member comprising two spring coils and an arched elastic arm connecting the two spring coils, wherein the arched elastic arm provides an elastic force to make the front cover slide relative to the rear cover; and
   two guiding rails, wherein each of the guiding rails is a substantially elongated bar and defines a guiding groove, the side strips of the rear cover slidably engage in the guiding grooves of the guiding rails, and the guiding rails engage in the two grooves of the second main plate.

2. The slide mechanism of claim 1, wherein the at least one elastic member comprises two elastic members.

3. The slide mechanism of claim 2, wherein each elastic member comprises a connecting arm extending from each of the two spring coils; and the connecting arms are correspondingly fixed to the rear cover and the front cover.

4. The slide mechanism of claim 3, wherein an end of each connecting arm is curled and defines a fixing hole; the rear cover defines a pinhole in a middle portion adjacent to a side of the rear cover; the front cover defines a pinhole in a middle portion adjacent to a side of the front cover; the slide mechanism further comprises a first rivet and a second rivet; the first rivet is inserted through a first fixing hole of the fixing holes of each elastic member, and the pinhole of the rear cover; an end of the first rivet is riveted to the rear cover; the second rivet is inserted through a second fixing hole of the fixing holes of each elastic member, and the pinhole of the front cover; and an end of the second rivet is riveted to the front cover.

5. The slide mechanism of claim 4, wherein the two elastic members are symmetrical relative to a line connecting the two rivets, and the spring coils abut the rear cover.

6. The slide mechanism of claim 1, wherein the front cover is a substantially flat sheet comprising a base and two sliding grooves defined at opposite side portions of the base; and the guiding rails are securely received in the sliding grooves.

7. The slide mechanism of claim 6, wherein each of the sliding grooves is formed by bending a side portion of the base inwards; the front cover defines a fixing hole in a middle portion of each side portion communicating with the corresponding sliding groove; and a protrusion is formed in a middle portion of each of the guiding rails to engage in its corresponding fixing hole.

8. A slide-type terminal device, comprising:
   a first housing;
   a second housing connected to the first housing; and
   a slide mechanism positioned between the first and second housings, comprising:
      a rear cover fixed to the first housing, the rear cover comprising a first main plate, and two side strips extending along opposite sides of the first main plate;
      a front cover comprising a second main plate and two grooves extending along opposite sides of the second main plate, slidably attached to the rear cover and fixed to the first housing;
      two elastic members connected between the rear cover and the front cover, each elastic member comprising two spring coils and an arched elastic arm connecting the spring coils, wherein the arched elastic arm provides an elastic force to make the front cover slide relative to the rear cover; and
      two guiding rails, wherein each of the guiding rails is a substantially elongated bar and defines a guiding groove, the side strips of the rear cover slidably engage in the guiding grooves of the guiding rails, and the guiding rails engage in the two grooves of the second main plate.

9. The slide-type terminal device of claim 8, wherein each elastic member comprises a connecting arm extending from each of the two spring coils; and the connecting arms are correspondingly fixed to the rear cover and the front cover.

10. The slide-type terminal device of claim 9, wherein an end of each connecting arm is curled and defines a fixing hole; the rear cover defines a pinhole in a middle portion adjacent to a side of the rear cover; the front cover defines a pinhole in a middle portion adjacent to a side of the front cover; the slide mechanism further comprises a first rivet and a second rivet; the first rivet is inserted through a first fixing hole of the fixing holes of each elastic member, and the pinhole of the rear cover; an end of the first rivet is riveted to the rear cover; the second rivet is inserted through a second fixing hole of the fixing holes of each elastic member, and the pinhole of the front cover; and an end of the second rivet is riveted to the front cover.

11. The slide-type terminal device of claim 10, wherein the two elastic members are symmetrical relative to a line connecting the two rivets.

12. The slide-type terminal device of claim 8, wherein the front cover is a substantially flat sheet comprising a base and two sliding grooves defined at opposite side portions of the base; and the guiding rails are securely received in the sliding grooves.

13. The slide-type terminal device of claim 12, wherein each of the sliding grooves is formed by bending a side portion of the base inwards; the front cover defines a fixing hole in a middle portion of each side portion communicating with the corresponding sliding groove; and a protrusion is formed in a middle portion of each of the guiding rails to engage in its corresponding fixing hole.

14. The slide-type terminal device of claim 8, wherein the spring coils abut the rear cover.

15. A slide mechanism, comprising:
a rear cover comprising a main plate, and two side strips extending along opposite sides of the main plate;
a front cover slidably attached to the rear cover, wherein the front cover is a substantially flat sheet comprising a base and two sliding grooves defined at opposite side portions of the base;
at least one elastic member connected between the rear cover and the front cover, the at least one elastic member comprising two spring coils and an arched elastic arm connecting the two spring coils, wherein the arched elastic arm provides an elastic force to make the front cover slide relative to the rear cover; and
two guiding rails securely received in the sliding grooves, wherein each of the guiding rails defines a guiding groove, and the side strips of the rear cover slidably engage in the guiding grooves of the guiding rails.

16. The slide mechanism of claim 15, wherein each of the sliding grooves is formed by bending a side portion of the base inwards; the front cover defines a fixing hole in a middle portion of each side portion communicating with the corresponding sliding groove; and a protrusion is formed in a middle portion of each of the guiding rails to engage in its corresponding fixing hole.

* * * * *